Aug. 24, 1926.
R. C. MITCHELL
RECORDER
Filed August 13, 1925   6 Sheets-Sheet 1
1,596,937
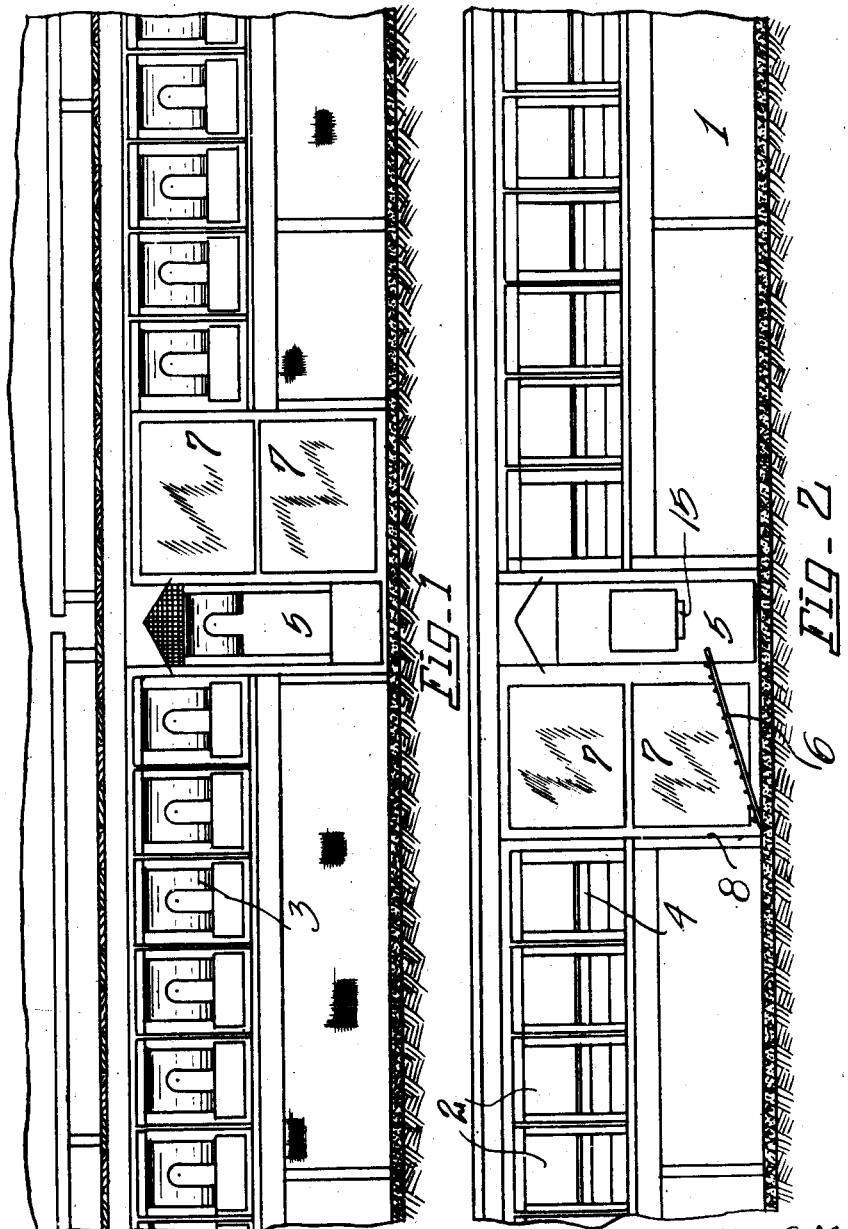
Inventor
Rollin C. Mitchell
By Herbert E. Smith
Attorney Aug. 24, 1926.

R. C. MITCHELL

RECORDER

Filed August 13, 1925

Inventor
Rollin C. Mitchell

By Herbert E. Smith
Attorney

Aug. 24, 1926.
R. C. MITCHELL
RECORDER
Filed August 13, 1925
1,596,937
6 Sheets-Sheet 3
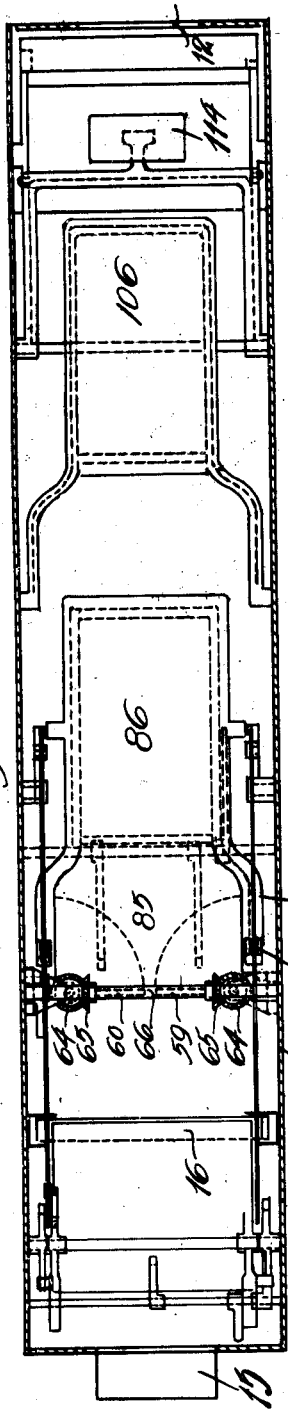
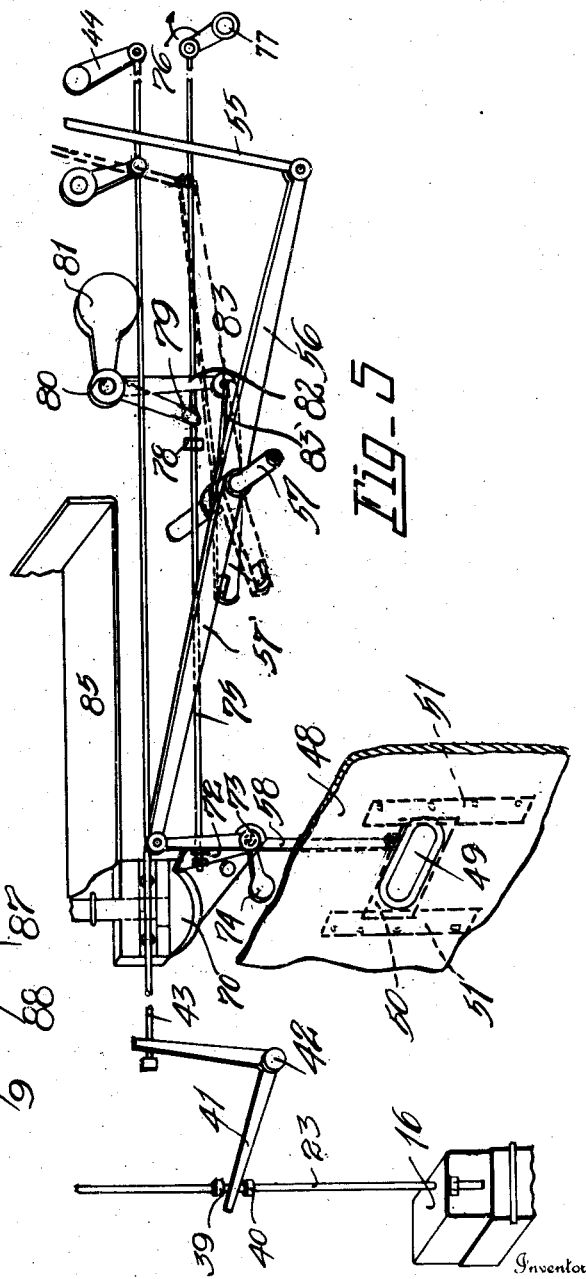
Inventor
Rollin C. Mitchell
By Herbert E. Smith
Attorney Aug. 24, 1926.

R. C. MITCHELL

RECORDER

Filed August 13, 1925     6 Sheets-Sheet 4

1,596,937

Inventor
Rollin C. Mitchell

By Herbert E. Smith
Attorney

Patented Aug. 24, 1926.

1,596,937

UNITED STATES PATENT OFFICE.

ROLLIN CRAWFORD MITCHELL, OF COLBERT, WASHINGTON.

RECORDER.

Application filed August 13, 1925. Serial No. 49,874.

My present invention relates to improvements in recorders and particularly to the operating mechanism therefor adapted for use in poultry houses, for recording the laying of eggs and identifying the hens that lay the eggs. The invention contemplates the use of automatically actuated or operated photographic apparatus for obtaining a picture of the identifying band that encircles the leg of the hen. The recorder is used in connection with a battery or series of trapnests from one of which the hen departs after laying an egg and then enters from the rear the housing which encloses the recorder and its operating mechanism. Means which are actuated by the weight of the hen upon depressible perches or platforms are employed for closing the rear door of the housing after the hen has entered and for opening the door as the hen leaves the housing, and means are provided for automatically opening and closing the front door of the housing. Mechanical and electrical connections are also provided for operating the photographic apparatus and other devices as the hen proceeds through the housing from the rear door out through the front door, as will hereinafter be pointed out.

The invention consists in certain novel combinations and arrangements of parts in connection with these broadly stated features as will be set forth in the annexed claims.

In the accompanying drawings I have illustrated one complete example of the physical embodiment of my invention wherein the parts are combined and arranged according to the best mode I have thus far devised for the practical application of the principles of my invention.

Figure 1 is a longitudinal vertical sectional view of a poultry house showing in front elevation two series of trapnests and an intermediate recording apparatus.

Figure 2 is a similar view from the rear of the nests from which the hens enter the recording apparatus.

Figure 4 is a longitudinal horizontal sectional view of the implement housing showing the operating mechanism in plan.

Figure 5 is an enlarged perspective detail view of the actuating mechanism for the operating means of the recorder.

Figure 3:
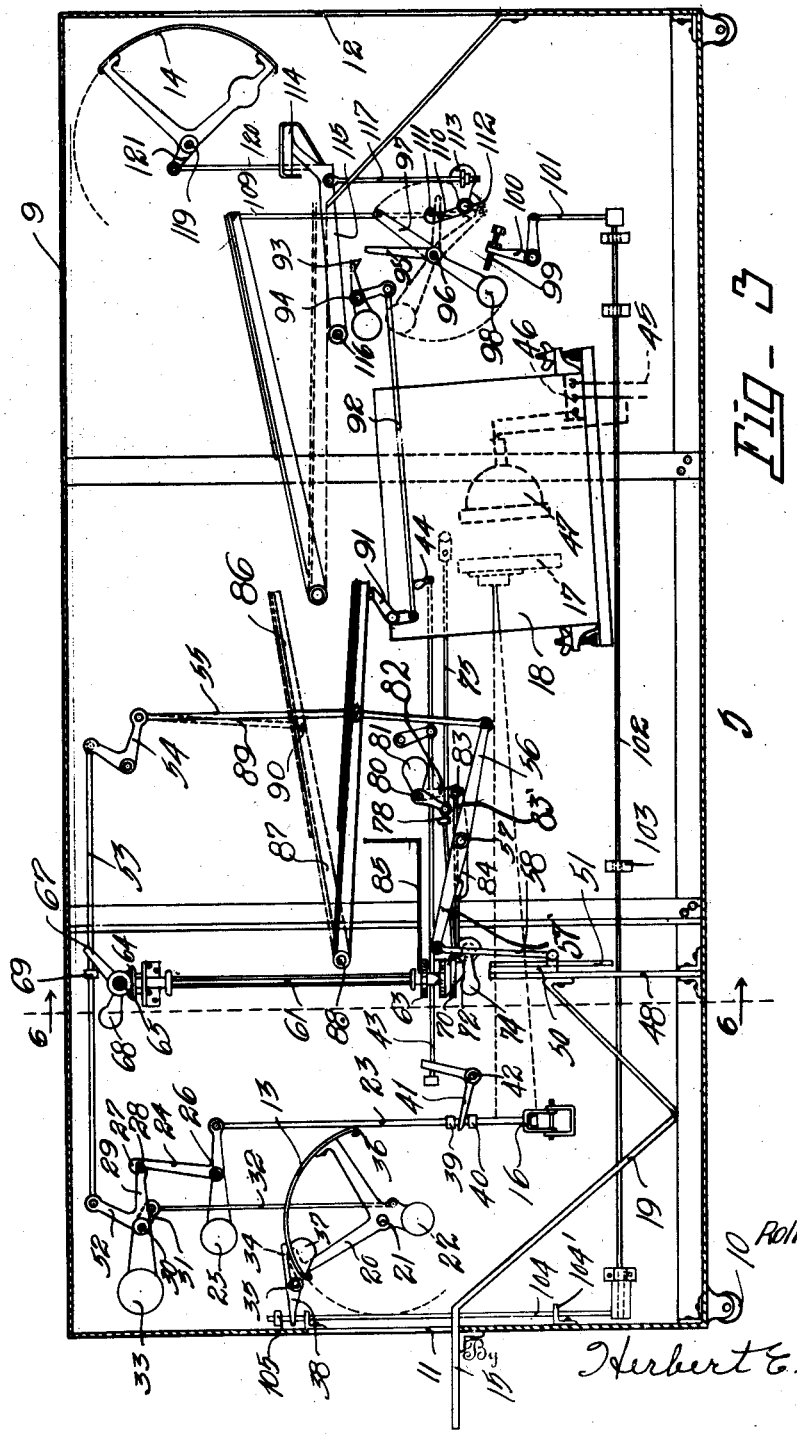
Figure 3 is a longitudinal vertical sectional view of the portable recording apparatus, or implement.

In order that utility and operation of the invention may readily be understood I have shown in Figs. 1 and 2 a poultry house 1 in which is located two series of transversely arranged trapnests 2 having front doorways 3 and rear doorways 4.

The recording implement designated as a whole by the numeral 5 is positioned between the two series or batteries of trapnests and the hen after laying an egg in one of the trapnests is entrapped with a single exit which compels her to enter the housing of the implement from the rear, and for this entry an inclined board or walk 6 is provided. Glass panels as 7 are interposed in the framework 8 between the recording implement and a series of the nests at one side thereof to permit passage of light rays in order that the hen may be guided by the light to return to the main flock of fowl. As passageway through the implement is the sole exit for the hen that has laid an egg, each successive hen is compelled to pass through the implement. Each hen is provided with an identifying band on its leg and after entering the housing of the implement the hen is constrained to stand in position a sufficient time to permit exposure of a photographic film. The film used is in the form of a strip of sensitized material as usual and its portions are successively exposed and rewound for the purpose of taking pictures of the bands of the successive hens as they pass through the implement.

The recording or photographic apparatus is encased with its actuating and operating parts in a portable cabinet or housing 9 preferably of metal, of rectangular shape, and equipped with wheels or casters 10 in order that it may readily be moved when necessary.

The housing has a rear opening 11 and a front opening 12, and it will be understood that the fowl enters the housing through the rear opening and pasess out of the housing through the front opening to return to the flock, moving from left to right in Figure 3.

A normally open rear door 13 is closed after the hen enters the housing and a normally closed front door 14 is opened for exit and closed after exit of the hen through the front doorway 12.

Only hens that have laid eggs are permitted, singly, to enter the housing by way of the inclined board 6, and from this board the hen hops upon a fixed exterior platform or perch 15. From this perch the hen is induced to enter the open doorway by seeing the lighted front end of the cabinet or housing, and hops through the doorway upon a suspended perch 16 which is in line with a camera indicated as 17 by dotted lines within the casing 18 that is located in the implement housing. Should the hen miss her footing upon the perch she is entrapped within a V-shaped trough 19 that extends transversely of the housing bottom, and from which she may extricate herself and alight upon the depressible perch 16.

The weight of the hen upon the perch 16 actuates means for immediately swinging the rotary door or shutter 13 to closed position with relation to the rear opening 11 and escape of the hen is prevented through the rear doorway.

In its construction the rotary door or shutter is fashioned as a curved plate having arms 20 and pivoted at 21 on trunnions in the side walls of the housing. It is provided with a counterweight 22 to assist in its swinging movement and for retaining it in open position with relation to the doorway 11.

The perch 16 is supported or suspended below the platform 15 and doorway 13 by means of a vertical suspending rod 23 which is connected at its upper end to a bell crank lever 24 having a weighted arm 25 and pivoted at 26 on the side wall of the housing. The bell crank lever has a release hook 27 integral therewith that engages over a pin 28 on an arm 29 fixed to rock with a shaft 30 having journal bearing in the wall of the housing. This shaft also has a crank arm 31 thereon which is pivotally connected by a link 32 to the weighted arm 22 of the door 13.

Figure 8:
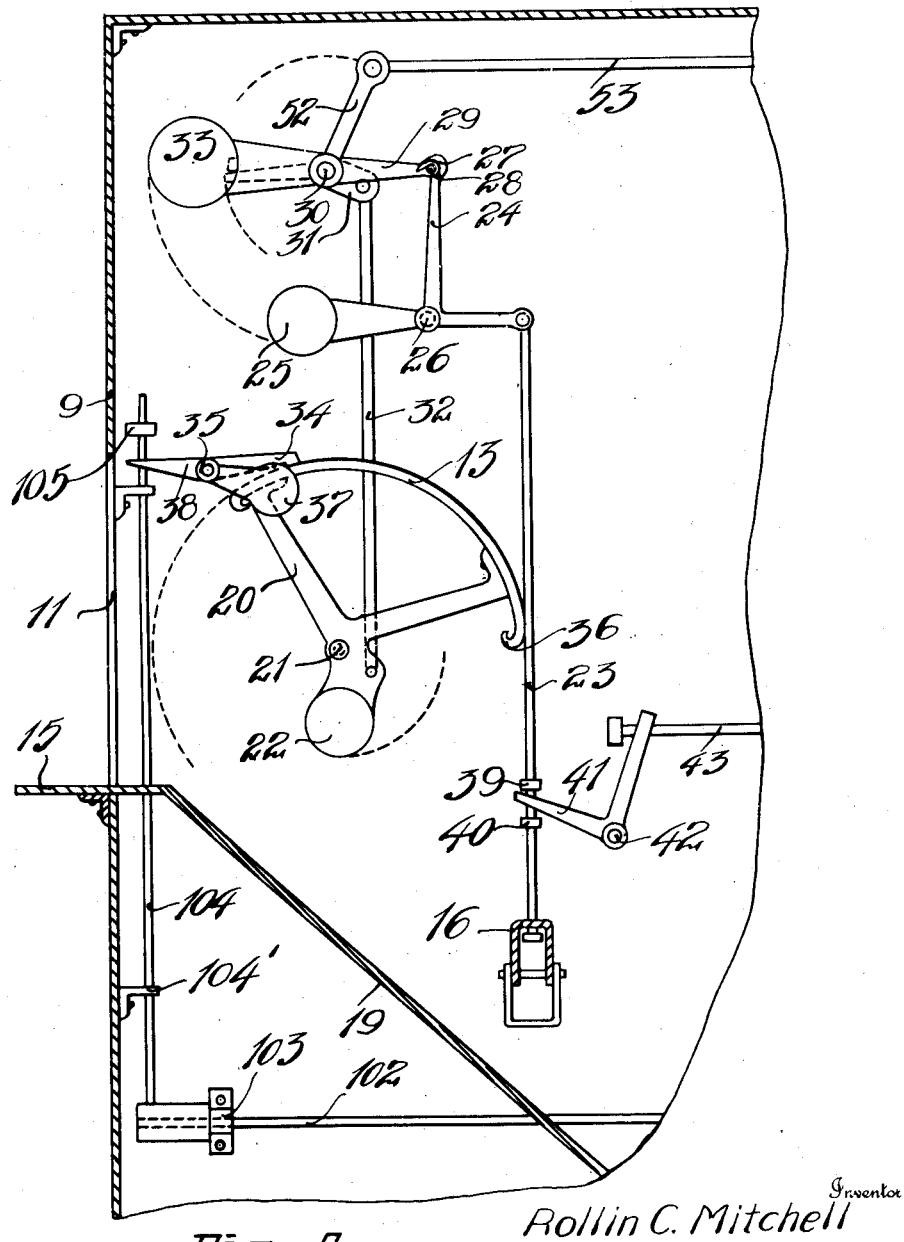
Figure 8 is an enlarged longitudinal vertical sectional view at the rear of the implement showing the normally open rear door through which the fowl enters the housing of the implement, and means for closing this door after the entry of the fowl.

On the rock shaft 30 a bell crank lever is fixed and provided with a weighted arm 33. Thus it will be apparent that when the perch 16 is depressed by the weight of the hen, the hook 27 is swung to the right in Figure 8 to release the arm 29 and the weighted arm 33 is free to swing or rock the shaft 30. As the shaft 30 is rocked the link 32 swings the rotary door or shutter 13 to closed position as indicated by dotted lines in Figure 8. The door is locked in this position by means of a pair of latches 34 pivoted at 35 at each side of the cabinet or housing of the implement which are designed to drop over and engage the end 36 of the door when the latter is closed. A weight 37 rigid with the latch 34 holds the latches in position for this engagement and detents 38 rigid with the latches are utilized to release the latches as will be explained, to permit automatic opening of the door at the proper time.

The hen is compelled to remain on the perch 16 while its leg band is being photographed, and the camera 17 is actuated by an electric motor within the recorder cabinet 18. The electric control switch of the motor is closed by mechanical means actuated by the down stroke or downward movement of the rod 23. For this purpose the rod is provided with a pair of spaced tappets 39 and 40 that co-act with a bell crank lever 41 pivoted at 42 in the housing wall. A horizontally disposed starting rod 43 is operatively connected at one end to the bell crank lever, and suspended at its other end from a crank arm 44 outside the cabinet 18, for closing the motor switch to cause the motor to operate the camera. The motor receives its current through wires 45 to the plug 46, and a spotlight 47 is illuminated to direct its rays on the band carried by the hen, when the motor circuit is closed to operate the camera. The picture of the identifying leg band is recorded on the sensitized film or strip of the camera and the motor automatically winds or rolls the strip for a succeeding exposure in well known manner. After the exposure in the photographic apparatus the motor is stopped automatically and the light switch is also opened to put out the spotlight.

In connection with the spotlight for illuminating the leg band means are provided whereby the light rays are directed and confined only to the band on the leg of the hen. For this purpose a transverse, vertical, fixed wall or partition 48 is provided in the lower portion of the housing in front of the perch 16 upon which the hen stands when the picture is taken, and the light-slot 49 is provided in the partition in line with the camera and the perch. This light slot is normally closed by a vertically movable slide plate or shutter 50 that is guided in its movements in side guide plates 51 on the wall or the partition 48.

When the hen alights on perch 16 the latch 24 is released allowing the door 13 to be closed. This latch also releases bell crank 29 which is operated by weight 33, arm 52 operates rod 53 connected to bell crank 54 which raises the perch 86 to dotted position. This action causes arm 56 to be raised to dotted position (Figs. 3 and 5). After the hen has alighted on perch 16 and catches her balance she immediately adjusts herself for the next move. During this time the bell crank 41 has started the motor in motion, thru rod 43. This action causes the pin 83 on arm 82 to release the arm 83' which allows arm 57' to release the shutter 50 through connecting link 58 allowing the shutter to open.

Two screen gates 59 and 60 that open outwardly are provided to prevent the hen leaving the perch 16 before the record photograph is taken. These normally closed gates are arranged transversely of the housing and provided with pintles 61 and 62 that are vertically disposed and journaled in bearing brackets 63 attached at the opposite sides of the housing. At their upper ends the pintles each have a bevel pinion 64 meshing with a complementary pinion 65 on the cross shaft 66 journaled near the roof of the housing and this shaft has near each end a fixed forked arm 67. The arms are each provided with a weight 68 (Fig. 3) and the weights co-act with complementary tappets 69 on the two rods or links 53 of the rear door operating mechanism. The gates are automatically opened by means of the weights 68 when the rods 53 move to the left in Fig. 3 and they are closed by action of the tappets 69 and arms 67 when rod 53 next moves to the right in Figure 3.

Figures 6, 7:
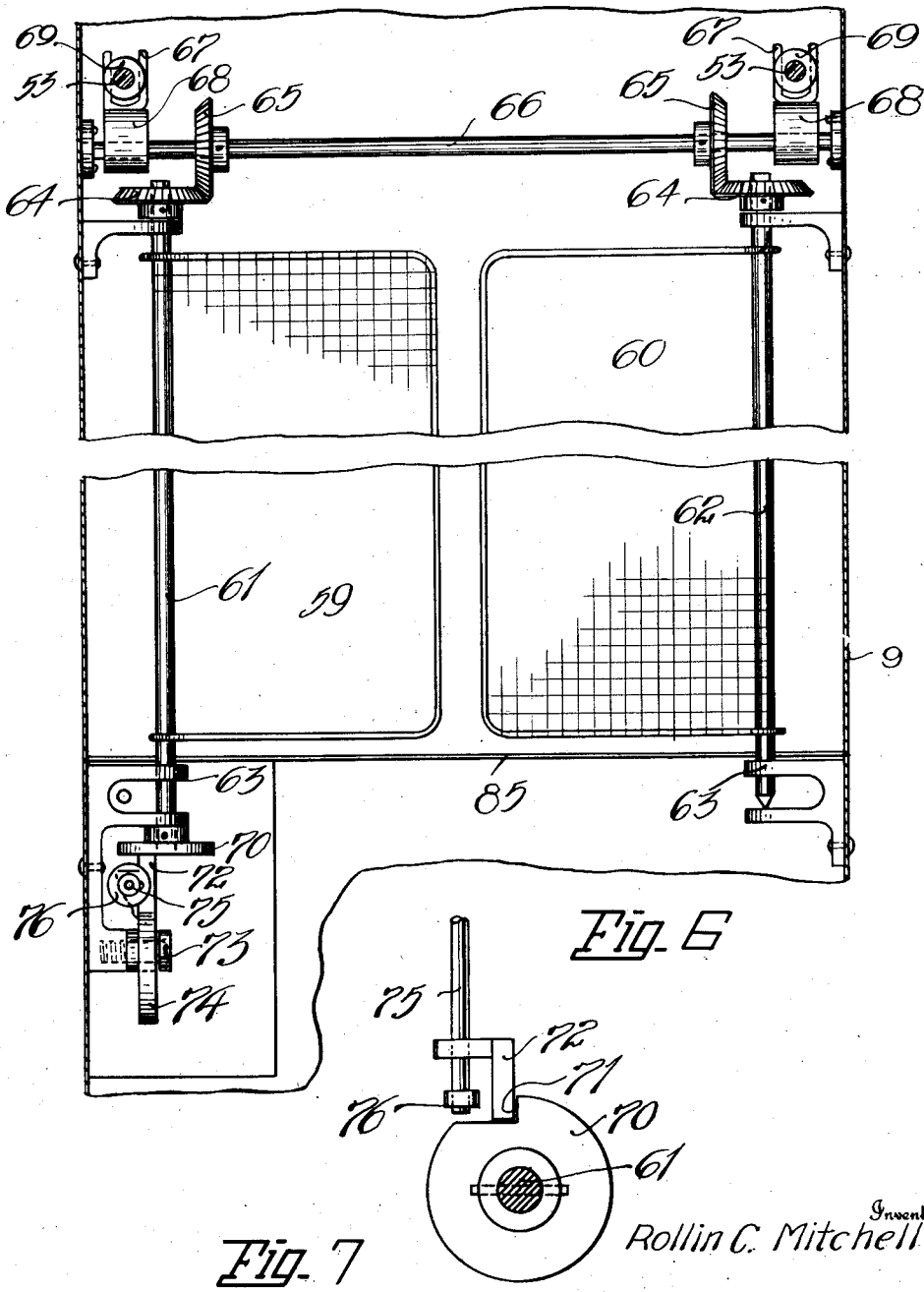
Figure 6 is an enlarged transverse vertical sectional view of the implement as at line 6—6 of Figure 3.
Figure 7 is a detail view of the release device for the swinging screen doors of Fig. 6.

For retaining the gates in normally closed position I provide a locking disk 70 on the gate pintle 61 which disk is horizontally disposed and provided with a peripheral notch 71 (Fig. 7) that is engaged by an angular detent 72 which is pivoted at 73 on one of the bearing brackets 63 at the side of the housing. This detent has a counter weight 74 rigid therewith and is provided with an opening for the horizontally disposed rod 75 having a tappet 76 on its end. The weighted detent by engagement with the notched disk is used to lock the gates in closed position.

The rod 75 is used as a release rod and it extends back along the camera cabinet 18. It is pulled to the right by means of arm 76 on shaft 77 when the latter is rotated as the motor operates, and as the rod 75 is pulled to the right a tappet 78 thereon engages the free end of an arm 79 on a rock shaft 80 rocking said shaft against the load of the counterweight 81 on the shaft. A release arm 82 which is also fixed to the shaft 80 is provided with a pin 83 at its free end which is swung out of engagement with a rock arm 83' to free the shaft 57 so that arm 57' may swing to slide the shutter or slide 50 for uncovering the opening 49 as heretofore described.

From the perch 16, after the photographic record has been taken, the fowl hops to a fixed platform 85 in front of the perch 16 and horizontally disposed transversely of the housing upon suitable supports, and from this stationary platform the fowl proceeds to a movable resetting platform 86, located above and in front of the stationary platform 85.

As seen in Figure 4 this perch 86 is of rectangular shape having rearwardly extending side arms 87 that are hinged at 88 to the side walls of the housing, and this resetting perch is held in normally uplifted or elevated position by means of two suspending arms 89 pivoted at 90 to the perch and suspended at their upper ends on the two bell crank levers 54 one at each side of the housing. The perch is returned to and retained in uplifted position by action of the weights 33 on the shaft. As the perch is lifted it also draws up on links 55 to swing the loose arm 56 on its shaft 57 to reset the slide 50.

By its weight, the fowl, when she alights upon the perch 86, depresses it and closes the two swinging gates behind her which gates are locked by detent 71 and disk 70; the weighted arm 33 is reset and locked by catch or hook 27 and the slide 50 is locked by action of lever arm 56 and pin 83.

Figure 9:
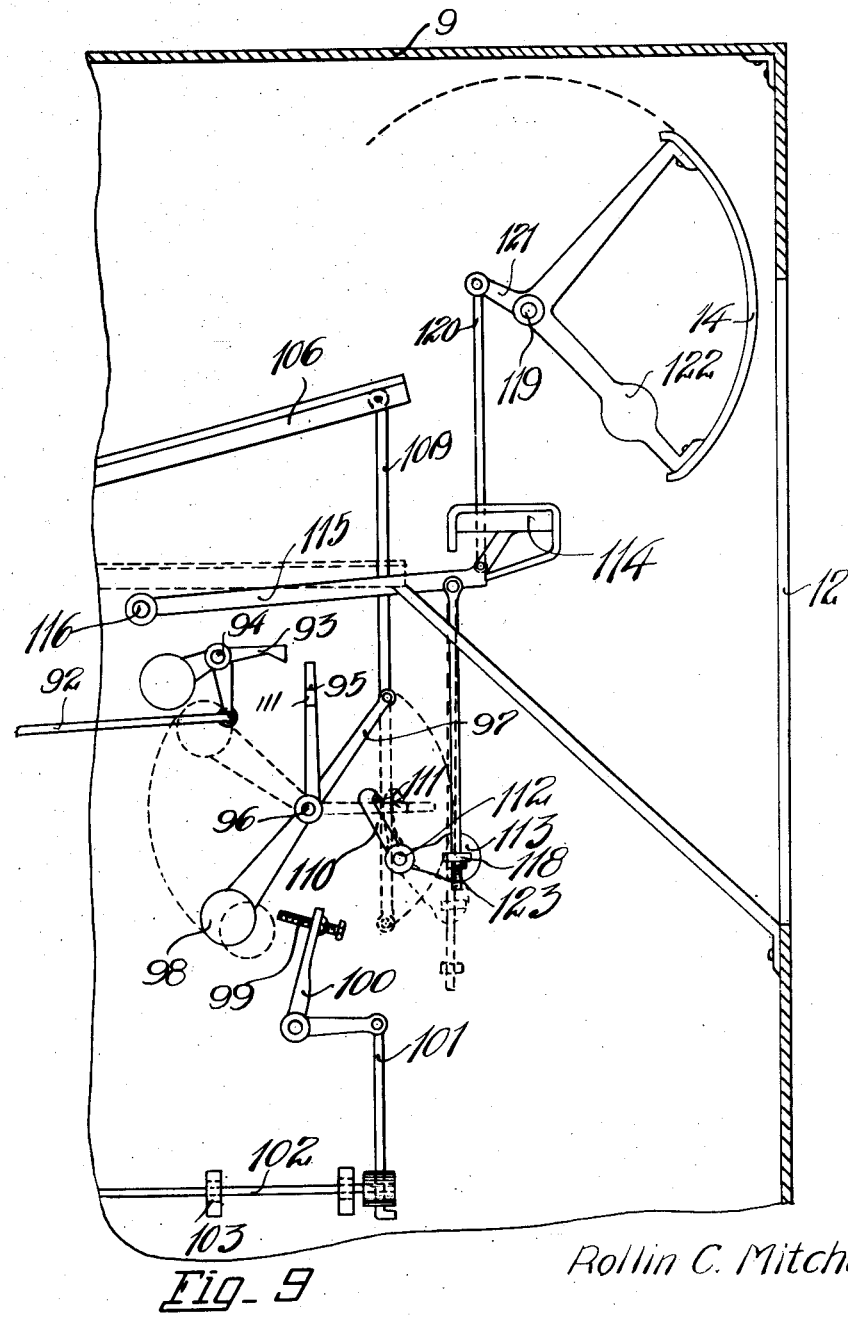
Figure 9 is a view similar to Fig. 8, at the front or exit end of the housing, showing the normally closed front door and means for opening it.

As seen by dotted lines in Figure 3, as the perch 86 is depressed and at the end of its down stroke it bears against a bell crank lever 91, which actuates mechanism, as a safety device, to prevent opening of the rear door 13 before the hen is through and beyond the opening 12. A slight movement of the bell crank lever 91 by contact from the perch 86 causes a link rod 92 to be pulled to the left in Figs. 3 and 9, and the pull of the link rod causes a weighted hook 93 pivoted at 94 to the side wall of the casing to swing down in the path of an arm 95 that may swing on its pivot 96 when not obstructed by this hook or abutment 93.

This arm or abutment 95 is rigid with an arm 97 and both arms are counterbalanced by means of the weight-arm 98.

When the hen leaves the housing by the doorway 12 at the front thereof, the rear door is released by contact of the weighted arm 98 with an adjustable bolt or screw 99 on a bell crank lever 100, which lever is connected to a vertical link 101 and the link is connected to turn a longitudinally disposed rock shaft 102 disposed near the bottom of the housing and journaled in bearings 103. This rock shaft extends to the rear of the housing where its end is connected to a vertical tappet rod 104 which is slidable in bearings 104' and provided with a tappet 105 at its upper end for co-action with the release arms 38 of the hook 34.

When the tappet rod 103 is lowered, tappet 105 strikes arm 38 to release hook 34 from end 36 of the closed rotary door permitting the door to swing open at the proper time as described.

The perch 86 now being locked in depressed position by the hook 27, the fowl proceeds toward the lighted or front end of the housing by hopping to another depressible perch 106 which is quite similar in construction to the perch 86 and has a pair of rearwardly extending side arms 107 pivoted at 108 to the side walls of the housing. Perch 106 has a rod 109 suspended therefrom which at its lower end is pivoted to arm 97, and as the perch is depressed the weighted arm 98 is swung up and the arm 95 swung down as indicated by dotted lines in Figure 9 where it is ready to be caught by a catch 110 which engages a pin 111 on the arm 95. This catch is pivoted at 112 on the side wall of the housing and has a weighted arm 113 rigid therewith.

From the large perch 106 the fowl steps down upon a final perch 114, which is depressible and has side arms 115 hinged at 116 to the side walls of the housing. A link 117 is pivotally suspended below the free end of the perch 114 and passes through a perforated lug 118 on the weighted arm 113. The descent of the arm 117 permits weight 113 to drop and swing the roller catch 110—111 into locking position over arm 95. It will be understood that this operation takes place before the entire weight of the fowl is removed from perch 106 in order that weight 98 may be locked in uplifted position.

The platform 106 which is now held down in its dotted position does not return to its normal uplifted position when the hen places both feet upon the last perch 114. The weight of the hen on perch 114 causes the door 14 to swing open on its pivot 119 by the pull of one or more links 120 pivoted to crank arms 121 of the door. The hen is now free to leap through opening 12 and hop down to the floor in the main front part of the poultry house and thus return to the flock.

When the fowl leaves the small perch 114 a weight 122 carried by the front door 14 swings the door to closed position. This closing action of the door also lifts the perch 114 to elevated position and as the perch rises it pulls up link 117 and with it the nut or tappet 123 thereon, which nut contacts with lug 118 of the weighted arm 113 and swings roller catch 110—111 to normal position, Fig. 9. This movement permits arm 95 to return to full line position in Figure 9 by the action of the weight 98, which swings down to full line position and thus elevates the perch 106 to its normal position.

As weight 98 swings down it strikes a blow against the adjustable bolt or screw tappet 99 to rock the bell crank lever 100. Through the movement of the bell crank lever the shaft 102 is rocked to unlock the closed rear door and permit it to be opened by action of its weight 22, this bringing the apparatus to position for the next hen to pass therethrough and operate the recording devices as indicated.

The hens that have laid eggs thus successively pass through the housing where the photographic record is made of the leg bands and from time to time the exposed films may be withdrawn and fresh films supplied for a complete and continuous record.

Having thus fully described my invention what I claim as new and desire to secure by Letters Patent is—

1. The combination with a housing having a normally open entrance door, a normally closed exit door, and an intermediate photographic-record apparatus, of a depressible posing-perch for a fowl and actuated under the weight of the fowl, operating means for the record-apparatus, means actuated by the movement of the posing perch connected with said operating means, means for closing the entrance door, and means for opening the exit door.

2. The combination with a housing having an entrance door and exit door at opposite ends and an intermediate photographic-record apparatus, of a depressible posing-perch for a fowl, an electric motor for the record-apparatus and means actuated by the movement of the perch for energizing said motor, means for automatically closing the entrance door and means for automatically opening the exit door as described.

3. The combination with a housing having an entrance door and exit door at opposite ends and an intermediate photographic-record apparatus, of a depressible posing-perch for a fowl, an electric motor for the record-apparatus, an electric illuminating lamp for the posing perch, and means actuated by the movement of the perch for operating said motor and lamp, means for automatically closing the entrance door and means for automatically opening the exit door.

4. The combination with a depressible posing-perch for a fowl, of a photographic-record apparatus and an electric motor therefor, an electric illuminating lamp for the perch, and means actuated by the movement of the perch for operating said motor and lamp.

5. The combination with a depressible posing-perch for a fowl and a spaced photographic-record apparatus and an electric motor therefor, of an intermediate wall having an opening therein and a slide shutter therefor, an electric illuminating lamp, and means operated by the movement of the perch for removing said slide and energizing said motor and lamp.

6. The combination with a depressible posing-perch for a fowl and a removable obstruction in front of said perch, of a photographic-record apparatus and an electric motor therefor, and means actuated by the movement of said perch for removing the obstruction and operating said motor.

7. The combination with a depressible posing-perch for a fowl and a pair of hinged normally closed gates in front of said perch, of a motor-operated record-apparatus, and means actuated by movement of said perch for operating the record apparatus and opening said gates.

8. The combination with a depressible posing-perch, a camera and operating means therefor and an illuminating lamp for directing its rays to said perch, of an intermediate wall having a light-opening and a shutter therefor, means actuated by the movement of the perch for actuating the operating means and illuminating the lamp, and automatic means for removing said shutter.

9. The combination with a depressible posing-perch for a fowl, of a camera and operating means therefor actuated by the movement of said perch, a depressible re-setting perch, and means actuated by the re-setting perch for restoring the posing-perch to normal position.

In testimony whereof I affix my signature.

ROLLIN CRAWFORD MITCHELL.